May 13, 1958     R. G. ALLEN     2,834,155
EQUALIZING MEANS FOR MOLD OPENING AND CLOSING MECHANISM
Filed Oct. 14, 1954     2 Sheets-Sheet 1

INVENTOR
RUSSELL G. ALLEN
BY
Rule and Hoge.
ATTORNEYS

May 13, 1958

R. G. ALLEN 2,834,155

EQUALIZING MEANS FOR MOLD OPENING AND CLOSING MECHANISM

Filed Oct. 14, 1954

INVENTOR
RUSSELL G. ALLEN
BY
ATTORNEYS

//  Patent 2,834,155 — May 13, 1958

United States Patent Office

2,834,155
EQUALIZING MEANS FOR MOLD OPENING AND CLOSING MECHANISM

Russell G. Allen, Godfrey, Ill., assignor to Owens-Illinois Glass Company, a corporation of Ohio Application October 14, 1954, Serial No. 462,227

3 Claims. (Cl. 49—41)

The present invention relates to machines for molding hollow glassware such as bottles and jars. The invention is applied to a machine of the type in which partible molds are opened and closed by movement of the mold halves to and from each other. In the preferred form of the invention as herein illustrated the mold sections are operated by air motors.

An object of the invention is to provide means for equalizing the opening and closing movements of the mold sections, preventing one section from moving faster than the other and distributing the pressure as required for such equalized movements. In the preferred embodiment of the invention, air operated motors or cylinders for moving the mold sections are connected by a rack and pinion mechanism which insures equal movement of the mold sections and which regulates and distributes the power applied for moving the mold sections.

Other objects of the invention will appear hereinafter.

Referring to the accompanying drawings.

Figure 1:
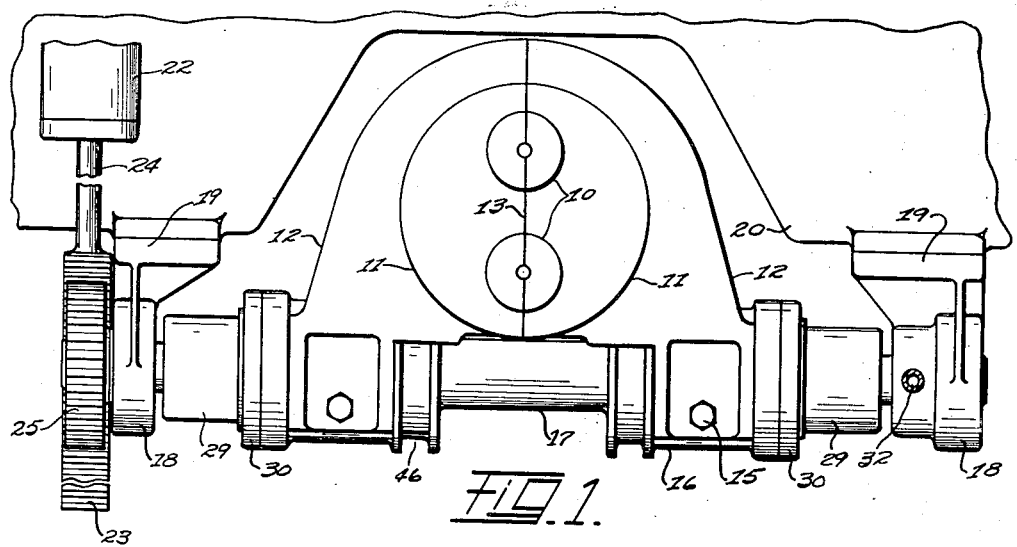
Fig. 1 is a plan view of a neck mold and apparatus for inverting and reinverting the mold.

Referring to the drawings, plural neck molds 10 are mounted in carriers 11 in neck mold arms 12. The molds are split with the mold sections meeting in the vertical plane of the line 13. The molds are opened by horizontal bodily movement of the mold sections and their carriers by means hereinafter described. The mold carrying arms 12 are attached by means of bolts 15 to cylinders 16 mounted on a horizontal shaft 17. The cylinders 16 are splined on the shaft for movement lengthwise thereof for opening and closing the molds and for rotation with the shaft for inverting and reinverting the molds. The shaft 17 is journalled in bearings 18 formed on brackets 19 bolted to the frame 20. The shaft 17 and parts carried thereby are rotatable back and forth through 180° for inverting and reinverting the molds. Means for rotating the shaft comprises a piston motor 22. A rack 23 attached to the motor piston 24 drives a gear 25 keyed to the shaft 17.

The mold sections are moved from open to closed position by coil springs 28 each mounted in a cylindrical housing comprising telescoping members 29 and 30. The members 30 are attached by bolts 31 to the cylinders 16. The members 29 are secured to the shaft 17 for rotation therewith. The springs 28 being under compression move the cylinders 16 inwardly, thereby closing the neck molds.

Figure 2:
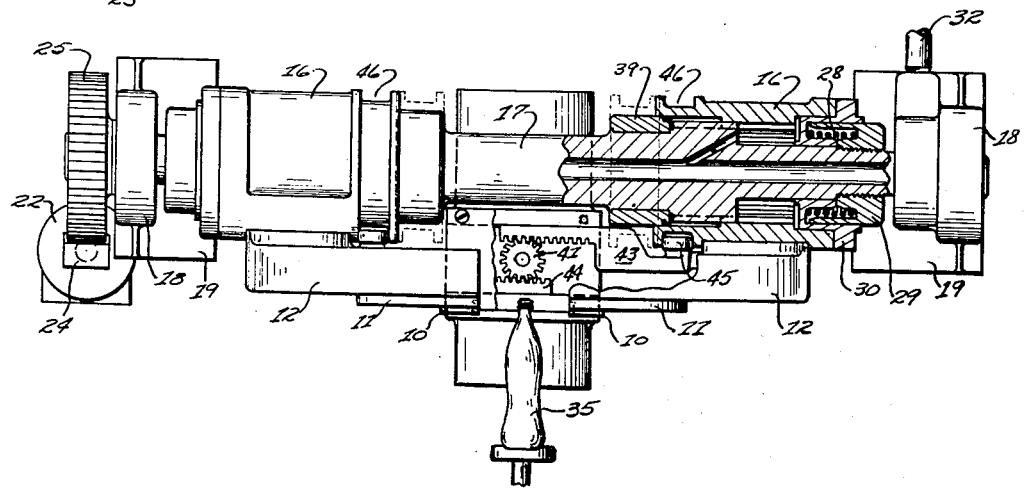
Fig. 2 is a part sectional elevation with the mold carrier inverted from the position shown in Fig. 1.

The cylinders 16 are moved outwardly for opening the molds by air pressure supplied through a pressure line including pipe 32, central bore or channel 33 extending lengthwise in the shaft 17, and branch channels 34 through which the pressure is transmitted to the inner ends of the telescoping cylinders or housing members 30. Air pressure supplied through this line moves the cylinders 16 outwardly along the shaft 17 to the full line position, Fig. 2 in which the mold sections are separated, releasing the blown articles 35.

Air leakage between the cylinders 16 and the shaft 17 is prevented by ring gaskets 38 mounted in split rings or collars 39 on the shaft.

Means are provided for equalizing the opening and closing movements of the mold sections and distributing the mold opening or closing pressure as may be required when there is any tendency for one section to be more sluggish in operation than the other. Such means comprises a rack and pinion mechanism mounted in a case 40 which is bolted to a non-rotating frame member. Such mechanism includes a pinion 41 rotatable on a pivot pin 42 and meshing with rack bars 43 and 44. The rack bars are movable lengthwise in the case 40. Each rack bar carries a roller 45 which runs in an annular channel 46, said channels being formed respectively in the cylinders 16.

Figure 3:
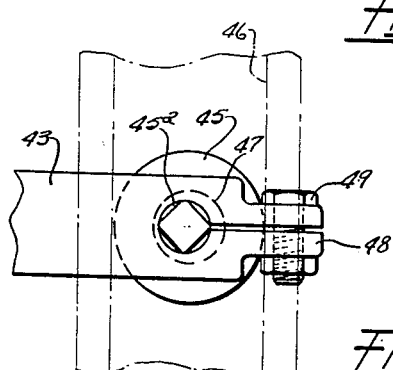
Fig. 3 is a detailed view of an eccentric bearing, the view being taken at the line 3—3 on Fig. 4.
Figure 4:
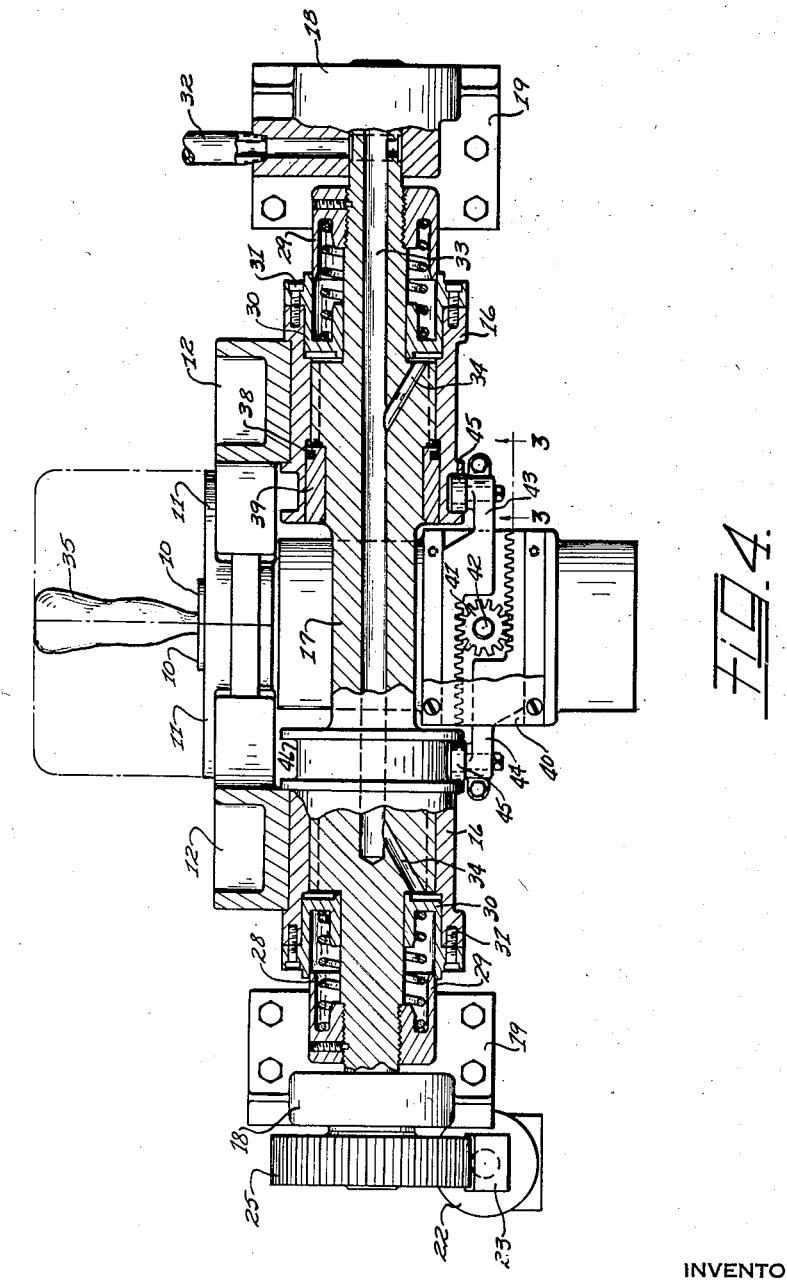
Fig. 4 is a part sectional elevational view with the parts in the position shown in Fig. 1.

Referring to Fig. 3, the rolls 45 are mounted on pivot pins 45a which are formed with eccentric bearings 47 for the rolls. The pivot pins are mounted in split bearings 48 permitting rotative adjustment of the eccentrics and are clamped in adjusted position by bolts 49. This construction permits adjustment of the rolls for centering the molds and their operating mechanism. The rack and pinion mechanism provides a means by which equal movement of the mold sections is insured and by which pneumatic pressure for opening the molds is distributed for increasing the opening pressure applied to either mold when needed. It also provides for equalizing the closing movements of the mold sections in like manner and operates positively to center the molds in their closed position.

Modifications may be resorted to within the spirit and scope of my invention.

I claim:

1. The combination of a horizontal shaft mounted for rotation about its axes, power mechanism for rotating the shaft, mold arms connected to the shaft for rotation therewith, a partible mold comprising mold sections carried by said arms, means comprising air operated motors for moving said arms lengthwise of the shaft and thereby opening and closing the mold, and centering mechanism interconnecting the mold arms and comprising means for positively controlling the movement of each mold arm relative to the other and equalizing the said opening and closing movements of the arms.

2. The combination of a horizontal shaft mounted for rotation about its axis, power mechanism for rotating the shaft, mold arms connected to the shaft for rotation therewith, a partible mold comprising mold sections carried by said arms, means for moving the said arms lengthwise of the shaft and thereby opening and closing the mold, the said means comprising air cylinders mounted on the shaft for movement lengthwise thereof and carrying said arms, means for supplying air under pressure to said cylinders, and centering mechanism interconnecting the mold arms and comprising means for positively controlling the movement of each mold arm relative to the other and equalizing the said opening and closing movements of the arms.

3. The apparatus defined in claim 2, including coil springs placed under compression by the movement of said cylinders under air pressure.

References Cited in the file of this patent

UNITED STATES PATENTS

| | | |
|---|---|---|
| 1,875,202 | Aftergut | Aug. 30, 1932 |
| 2,593,771 | Laidig | Apr. 22, 1952 |